United States Patent
Figus

(10) Patent No.: US 9,957,919 B2
(45) Date of Patent: May 1, 2018

(54) ANAEROBIC HYBRID PROPULSION DEVICE WITH FUEL PRESENT IN THE FORM OF DIVIDED SOLIDS

(71) Applicant: AIRBUS DEFENCE AND SPACE SAS, Les Mureaux (FR)

(72) Inventor: Christophe Figus, Dremil Lafage (FR)

(73) Assignee: AIRBUS DEFENCE AND SPACE SAS, Les Mureaux (FR)

( * ) Notice: Subject to any disclaimer, the term of this patent is extended or adjusted under 35 U.S.C. 154(b) by 510 days.

(21) Appl. No.: 14/427,963

(22) PCT Filed: Sep. 10, 2013

(86) PCT No.: PCT/EP2013/068744
§ 371 (c)(1),
(2) Date: Jun. 22, 2015

(87) PCT Pub. No.: WO2014/040998
PCT Pub. Date: Mar. 20, 2014

(65) Prior Publication Data
US 2015/0285188 A1    Oct. 8, 2015

(30) Foreign Application Priority Data
Sep. 13, 2012  (FR) ...................................... 12 02444

(51) Int. Cl.
*F02K 9/94* (2006.01)
*F02K 9/72* (2006.01)
*F02K 9/10* (2006.01)

(52) U.S. Cl.
CPC .................. *F02K 9/72* (2013.01); *F02K 9/10* (2013.01); *F02K 9/94* (2013.01); *F05D 2300/501* (2013.01); *F05D 2300/514* (2013.01)

(58) Field of Classification Search
CPC ..... F02K 9/10; F02K 9/24; F02K 9/36; F02K 9/44; F02K 9/72
See application file for complete search history.

(56) References Cited

U.S. PATENT DOCUMENTS

| | | | | |
|---|---|---|---|---|
| 3,456,440 | A | * | 7/1969 | Keller ........................ F02K 9/62 60/251 |
| 3,584,461 | A | | 6/1971 | Pessac et al. |
| 3,813,007 | A | * | 5/1974 | Doin .......................... B01J 7/00 222/389 |

(Continued)

FOREIGN PATENT DOCUMENTS

FR           1595755 A       6/1970

*Primary Examiner* — Arun Goyal
(74) *Attorney, Agent, or Firm* — Im IP Law; C. Andrew Im

(57) ABSTRACT

An anaerobic propulsion device of hybrid type. The propulsion device includes a combustion chamber into which an oxidant is injected thereto comes into contact with a fuel. The chamber includes an orifice, notably a nozzle, to inject the combustion gases. The fuel takes the form of solids divided into granules, typically grains, powder or beads. The propulsion device further includes a segregation device arranged between a reservoir for granules of solid fuel, and the combustion chamber. The segregation device is configured to prevent granules of fuel in solid form from passing between the reservoir and the combustion chamber. The segregation device includes orifices to allow the passage of the fuel, once the fuel has become pasty, liquid or vaporized.

24 Claims, 5 Drawing Sheets

(56) References Cited

U.S. PATENT DOCUMENTS

| | | | |
|---|---|---|---|
| 5,582,001 A * | 12/1996 | Bradford | F02K 9/72 |
| | | | 60/207 |
| 6,357,357 B1 | 3/2002 | Glasser | |
| 8,387,361 B2 * | 3/2013 | Ho | F02K 9/26 |
| | | | 60/219 |
| 2004/0148925 A1 | 8/2004 | Knight | |
| 2010/0064925 A1 | 3/2010 | Cavalleri | |

* cited by examiner

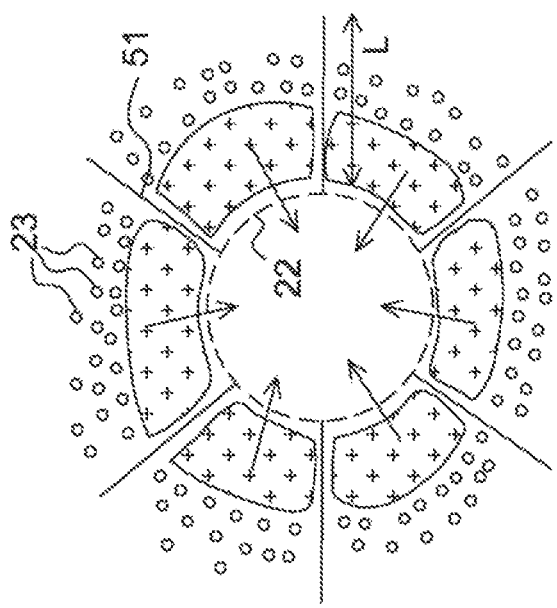

ANAEROBIC HYBRID PROPULSION DEVICE WITH FUEL PRESENT IN THE FORM OF DIVIDED SOLIDS

RELATED APPLICATIONS

This application is a § 371 application from PCT/EP2013/068744 filed Sep. 10, 2013, which claims priority from French Patent Application No. 12 02444 filed Sep. 13, 2012, each of which is herein incorporated by reference in its entirety.

TECHNICAL FIELD OF THE INVENTION

The present invention is from the field of anaerobic propulsion devices, typically used in the propulsion of satellites or rockets.

It relates more specifically to a hybrid propulsion device in which the fuel is stored in the form of solid whereas the oxidant (oxidizing agent) is stored in liquid form.

BACKGROUND OF THE INVENTION

Propulsion referred to as "hybrid", namely propulsion combining a solid fuel with a liquid oxidant, has been known for over 50 years. It was developed chiefly for rocket motor propulsion because it does not use ambient air to supply an oxidizing agent. Its main characteristic is a high level of thrust even in the anaerobic phase, thanks to use of a liquid oxidant.

In most instances, the motor 11 is made up of a hermetic chamber 12 in which is stored, for example, a brick of powder 13 (see FIG. 1). Made in the brick of powder 13 are one or more ducts 14 (which form part of the volume of the combustion chamber) into which an oxidant is injected, in this instance via an injector 15 situated in the upper part of the combustion chamber. The liquid oxidant is injected into the ducts 14 at a high temperature (typically >800 K) under the effect of a pyrotechnic igniter and/or a catalytic decomposition. Under the effect of the temperature, the brick of powder 13 vaporizes at the walls of the ducts 14 and begins to react (combust) with the oxidant. The expansion of the gases thus generated (through a nozzle 16) generates a thrust.

Once combustion has been initiated, the system is sustained with the injection of oxidant at ambient temperature (typically 300 K) and the vaporization of the solid/powder fuel.

During the course of combustion, the brick of powder 13 is consumed and the size of the ducts 14 increases. This type of operation is termed "radial combustion" on account of the radial increase in the size of the ducts.

Such a hybrid motor is, for example, described in Rockwell patent document U.S. Pat. No. 5,101,623 (1992).

This type of motor has the disadvantage of a progressive increase in the size of the ducts 14 over time, and therefore in the volume of the combustion chamber which consequently leads to a significant variation in the thrust provided by the motor over the course of time.

This type of motor is also ill-suited to large volumes of powder/solid brick because it requires, in order to limit the variation in volume of the combustion chamber during combustion, the use of a duct (and a brick of powder/solid) that is very long (by comparison with its diameter). This type of constraint, which leads to motors which are long and slender, is somewhat incompatible with use on a satellite.

SUMMARY OF THE INVENTION

To this end a first aspect of the invention relates to a propulsion device comprising a segregation device arranged between a reservoir of granules of solid fuel and a combustion chamber, the segregation device being designed to prevent granules of fuel in solid form from passing between the reservoir and the combustion chamber but comprising orifices that allow the passage of fuel once this fuel has become pasty, liquid or vaporized.

The granules in question are of substantially convex, for example spherical, shape (in order to facilitate movements whereby one granule slides over another and therefore facilitate the flow of a volume of granules in a reservoir) or polyhedral shape, the granules having diameters comprised within a predetermined range of dimensions (typically a few millimeters).

In that way, the fuel can be stored in the reservoir, the oxidant being injected into the combustion chamber which is raised to a temperature high enough to make the fuel present in the reservoir in the immediate vicinity of the segregation device melt then pass in liquid phase across the segregation device and finally vaporize under the effect of temperature. The fuel thus vaporized comes into contact with the oxidant and an exothermic chemical reaction takes place between them, sustaining the combustion in the combustion chamber for as long as oxidant is injected or fuel is present in the reservoir in the immediate vicinity of the segregation device.

It is clear that this device, associated with the choice of a fuel in the form of solids divided into granules, allows fuel to be kept constantly in the vicinity of the segregation device, thereby solving the prior art problems of an ever increasing volume of the combustion zone during this combustion. Likewise, this device ensures that the symmetry of the combustion zone is maintained, unlike in the prior art.

Advantageously, the segregation device comprises a holed structure, the dimension of the holes of which is smaller than a dimension chosen beforehand as a function of the mean diameter of the solid-fuel granules. This arrangement encourages a simple embodiment. The holed structure may notably be a grating with a mesh size chosen as a function of the mean diameter of the granules.

In another embodiment, the segregation device comprises a structure made of porous material with open pores, wettable by the fuel, when this fuel is locally liquefied under the action of heat. Open pores mean that a liquid wetting the porous structure can pass through it. This arrangement encourages better isolation of the granules situated in the granules reservoir, making it possible to prevent granules distant from the surface of the segregation device melting or clumping together.

In one particular embodiment, the combustion chamber is of substantially cylindrical shape, the segregation device constituting at least part of the lateral surface of said combustion chamber. In this way, operation equivalent to that of the hybrid rocket engines of the prior art is obtained, but without the disadvantage of a combustion chamber volume that increases during the combustion of the solid fuel.

In another embodiment, which may be used in conjunction, the segregation device constitutes at least part of the upper surface of said combustion chamber, namely the surface opposite to the ejection orifice for the combustion gases. In this way, it is possible to supply the combustion chamber via the upper face, for example creating oxidant injectors on the lateral surface thereof.

In one particular embodiment, the reservoir of fuel granules comprises means for applying to the granules a pressure designed to push them toward the segregation device. The means of applying a pressure may consist of a deformable membrane (for example elastomer) arranged at the surface of the volume of granules or the piston applied to this volume. Alternatively, the pressure applied to the granules of solid may be of a hydrostatic nature, under the simple effect of the thrust and acceleration experienced by the rocket engine. The application of a pressure higher than the pressure obtaining in the combustion chamber at the time of said combustion is needed in order to keep the fuel granules pressed firmly against the segregation device.

According to various embodiments, which may potentially be used in conjunction where technically feasible,

- the propulsion device is of the shape substantially exhibiting symmetry of revolution about an axis referred to as a vertical axis, and the fuel reservoir is arranged around the combustion chamber, at the opposite end thereof to the exhaust nozzle. This arrangement allows the solid fuel to be stored in the immediate proximity of the combustion chamber, thereby contributing to the simplicity of the device. Alternatively, the fuel reservoir may be distant from the combustion chamber and the device may comprise a pipe conveying granules of solid fuel to an intermediate solid-fuel-storage chamber, said intermediate storage chamber being arranged around or above the combustion chamber.
- the fuel reservoir comprises an elastomer membrane designed to separate, within the reservoir, a space for the storage of granules and a pressurizing space, said pressurizing space comprising pressurizing orifices connected to at least one gas injection system. The use of an elastomer membrane allows the device to be embodied simply and allows the pressurizing means to be adapted to suit non-cylindrical volumes.
- the fuel reservoir comprises a set of radial dividers which are perpendicular to the surface of the segregation device, these dividers having a geometry with a capillary gradient encouraging the supply of the grating with the paste or liquid.

Thanks to this arrangement, the propulsion device can be reignited in flight, even when some of the solid fuel granules have melted and fused into a single block near the segregation device, after the rocket engine has become extinguished. Specifically, the radial dividers determine blocks of granules each shaped into an arc of a circle (preferably subtending a few tens of degrees at most), and allow the lateral edges of the blocks of granules to be reheated locally and slide, under the effect of the pressurization, toward the segregation device, thus allowing the rocket engine to be restarted after it has stopped. The space created by the ortho-radial arrangement of the stiffeners also encourages the migration of the liquefied phase of the fuel by a capillary effect toward the holed device (or porous material).

A second aspect of the invention relates to an anaerobic rocket engine of the hybrid type, said rocket engine comprising a propulsion device as explained, a volume of solid fuel and a volume of liquid oxidant, characterized in that the solid fuel takes the form of solids divided into granules (typically grains, powder or beads).

What is meant here by a rocket engine is a propulsion device supplemented by its fuel and its oxidant.

In one particular embodiment, the fuel comprises beads made of polyethylene or of polybutadiene. In another embodiment, the fuel comprises beads made of paraffin. These beads advantageously have a diameter of 1 to 5 millimeters.

The invention also relates to a satellite comprising a device or rocket engine as explained.

BRIEF DESCRIPTION OF THE DRAWINGS

The features and advantages of the invention will be better appreciated from the description which follows, which description explains the features of the invention through one non-limiting example of application.

The description relies on the attached figures which depict:

FIG. 5: a view in cross-section of a device according to the invention, at the combustion chamber.

DETAILED DESCRIPTION OF ONE EMBODIMENT OF THE INVENTION

The present invention relates to a "hybrid" rocket engine with radial combustion. The rocket engine 20 as defined here entirely non-limitingly exhibits symmetry of revolution about a longitudinal axis X.

Figure 1:
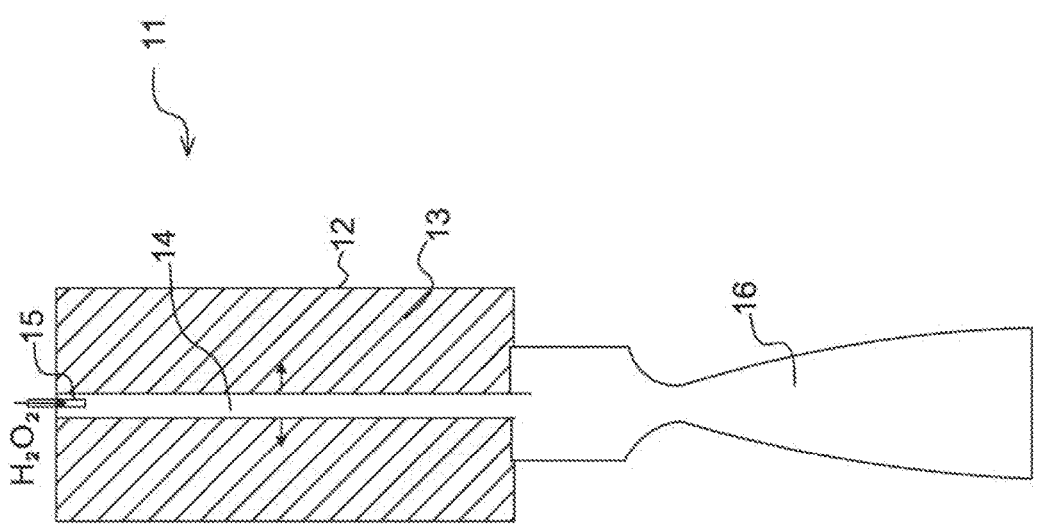
FIG. 1 (already cited): a schematic depiction of a hybrid motor with radial combustion chamber, according to the state of the art.
Figure 2:
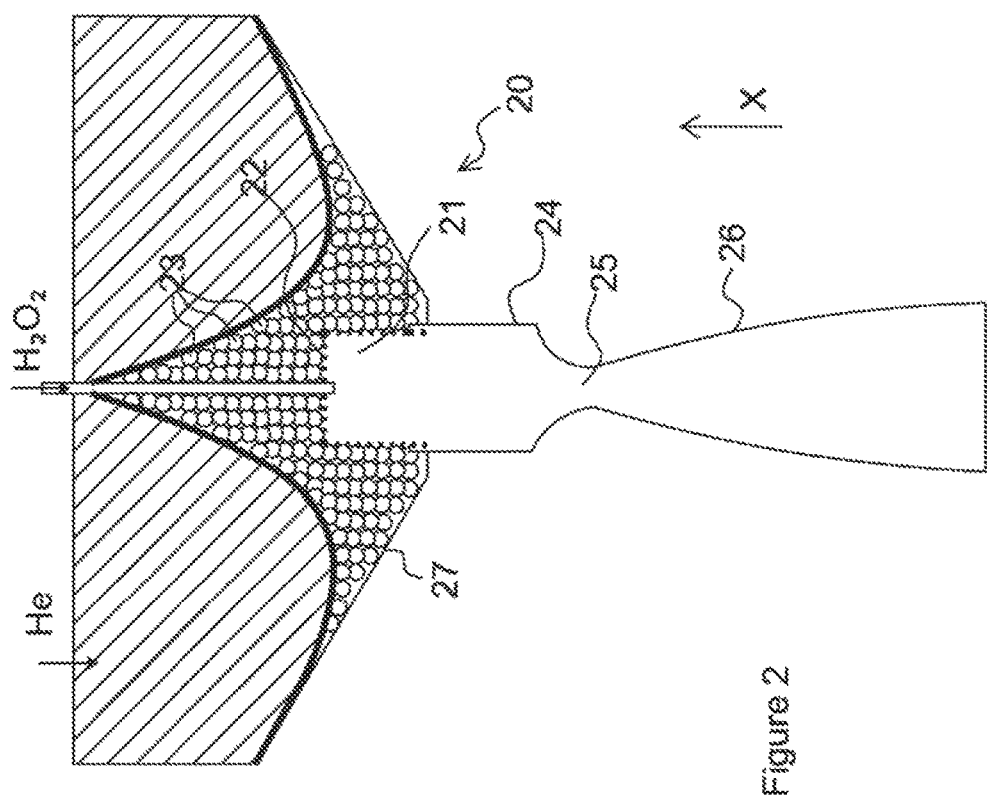
FIG. 2: a schematic depiction of a hybrid motor with a device for expelling solid.
Figure 4:
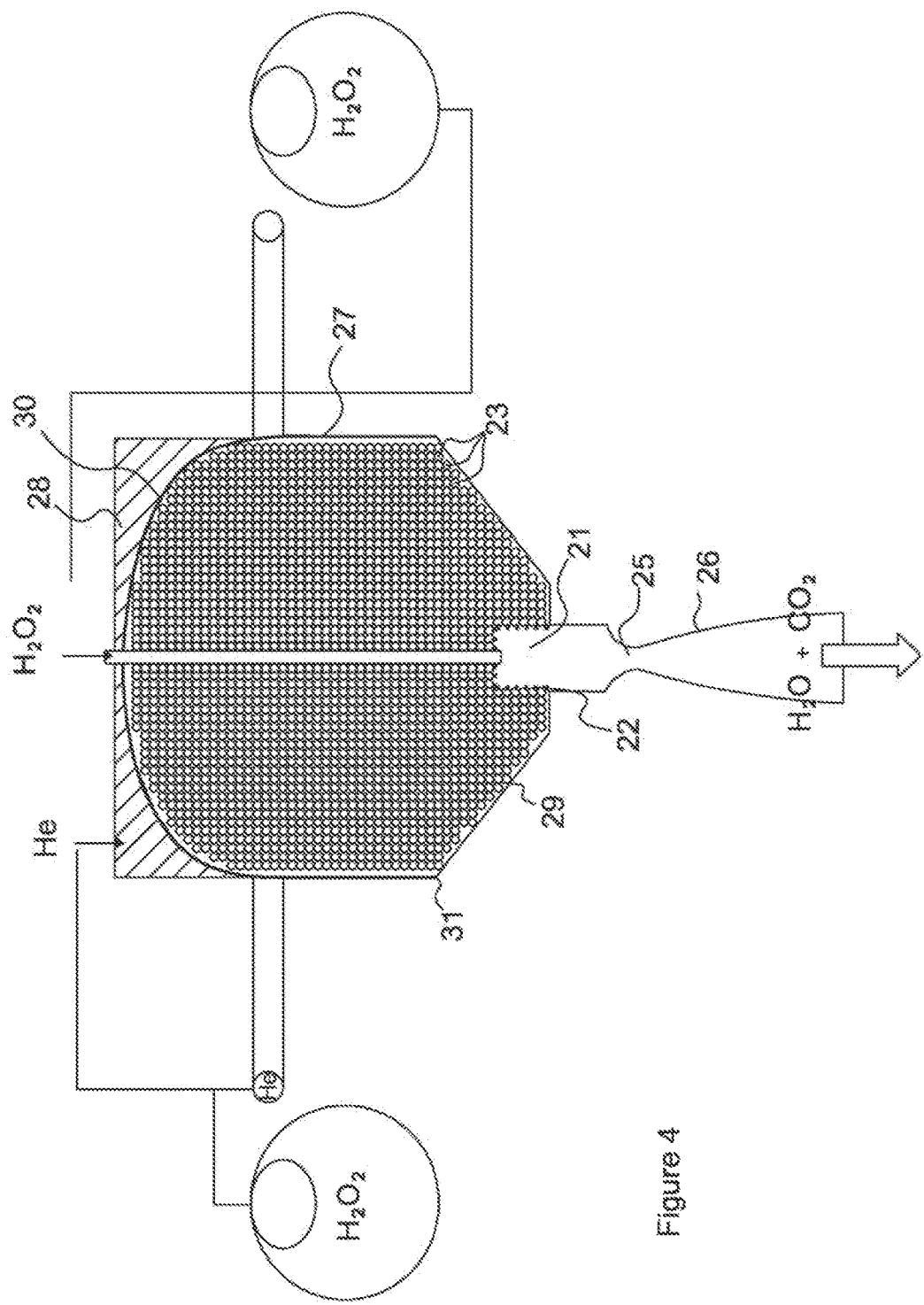
FIG. 4: a schematic depiction of a hybrid motor with a device for expelling solid, and elements for supplying oxidant.

As can be seen in FIGS. 2 and 4, the rocket engine 20 first of all comprises a reservoir 27 of fuel granules, secondly a reservoir of oxidant (not illustrated in the figures) and finally a combustion chamber 21.

Unlike in the prior art, in which the fuel is stored actually within the combustion chamber, typically in the form of a brick of powder provided with a hollowed central duct, the solid fuel here is configured in the form of divided solid (powder, beads, grains), of small dimension (typically a few millimeters) and is stored outside of said combustion chamber 21 in a dedicated reservoir.

As mentioned earlier, what is meant here by divided solids is a solid divided into granules 23 of substantially convex, for example spherical or polyhedral, shape, the granules having diameters comprised within a range of predetermined dimensions, of the order of one to a few millimeters in diameter, although these values are entirely non-limiting. The material of the granules is, for example, polyethylene or paraffin or any other solid fuel compatible with being configured in the form of beads.

In this embodiment, as illustrated in FIG. 4, the fuel reservoir 27 takes the form of a cylinder which is wider than it is long, the top end 28 (at the top in the figures) of which is lens-like or hemispherical (or any other shape), and the bottom end 29 of which, near the combustion chamber 21, is substantially frustoconical, forming a funnel toward the upper part of the combustion chamber 21.

The nature of the materials of which the reservoir is made do not as such fall within the scope of the invention. The sizing of said fuel-granules reservoir 27, given here by way of non-limiting example, is sufficient to accommodate several hundred kilos of fuel in the form of granules.

Figure 3:
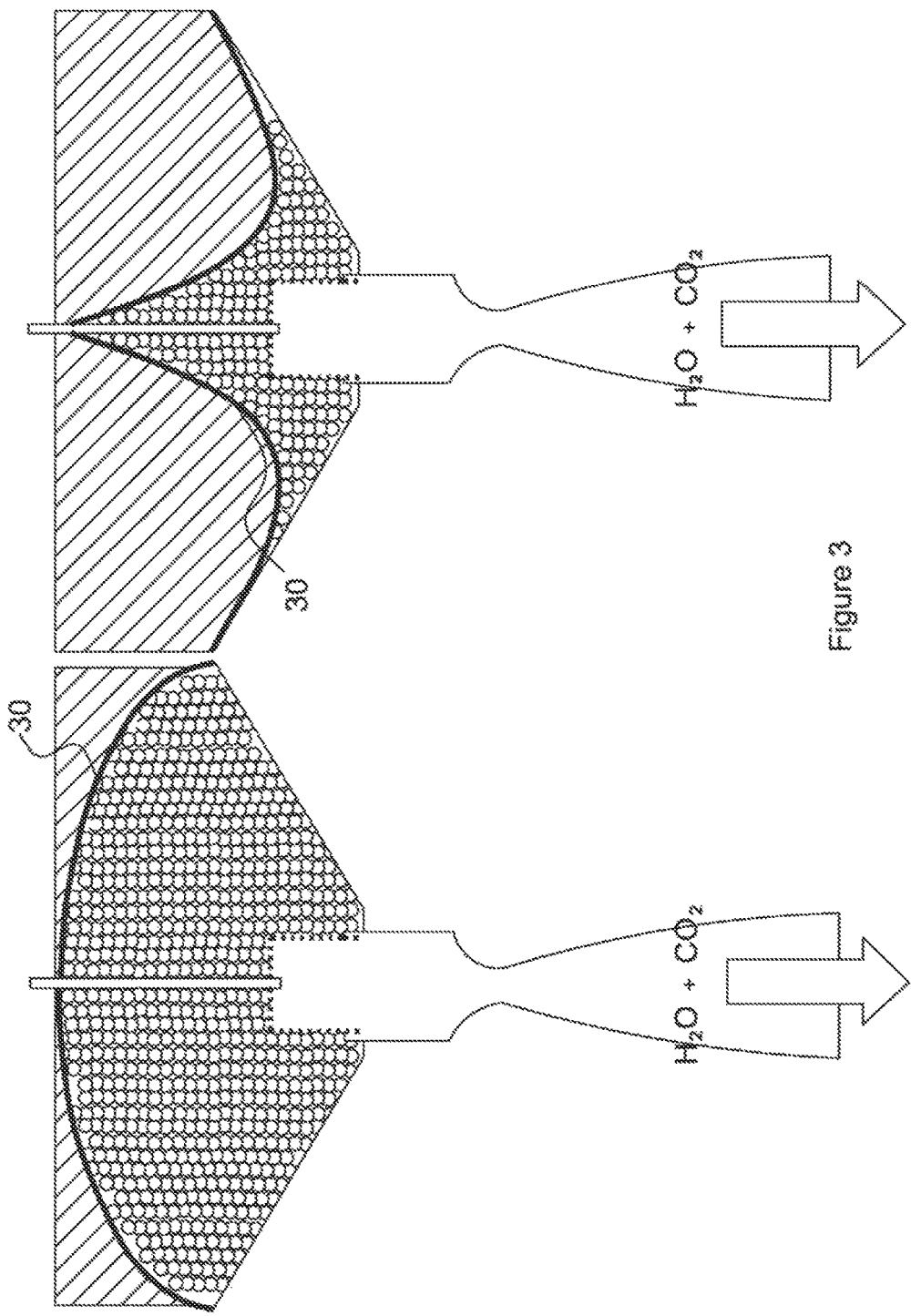
FIG. 3: a schematic depiction of a hybrid motor with a device for expelling solid, at the start and end of combustion.

In this embodiment, the fuel reservoir 27 comprises a deformable membrane 30 (also visible in FIGS. 3a and 3b), arranged between the upper surface 28 of the reservoir 27 and the granules of fuel. This deformable membrane 30 in this instance is secured to the lateral periphery of the fuel reservoir 27 at the joint 31 between the frustoconical part and the cylindrical part of said reservoir 27. The deformable membrane 30 thus forms a hermetic divider of the fuel reservoir 27 delimiting two parts, thereby allowing the volume containing the fuel granules to be pressurized. In the example illustrated here, the upper part of the fuel reservoir 27 is pressurized using gas, for example helium.

The deformable membrane 30 is flexible enough that it can almost completely conform to the lower surface of the reservoir 27 when this part is emptied of its fuel granules. In this example, this membrane is made of elastomer, but any other material that is deformable and chemically inert with respect to the fuel, may be contemplated.

The level of pressurizing considered is greater than or at least equal to the pressure obtaining in the combustion chamber when the rocket engine is in a steady state.

In alternative forms of embodiment, the pressurizing of the volume containing the fuel granules is performed by mechanical pressure through the use of a piston. It may also be achieved under the effect of a hydrostatic pressure (pressure exerted by the thrust of the motor as the support on which it is mounted accelerates).

As far as the oxidant reservoir is concerned, this is of a type and dimensions known per se. It stores an oxidant such as H2O2 or any other oxidant compatible with the chosen fuel.

The combustion chamber 21 here, but non-limitingly, arranged directly under the fuel-granules reservoir 27, takes the form of a substantially cylindrical duct, said duct being bounded at its top periphery, over a segment of the cylinder that delimits the combustion chamber 21, by a grating or a surface made of porous material referred to in the remainder of the description as a "fuel segregation device" 22.

This fuel segregation device 22 separates the fuel granules reservoir 27 from the combustion chamber 21. Its purpose is also to allow, on that face thereof that faces toward the combustion chamber 21, the oxidant injected into said combustion chamber to be brought into contact with fuel that has turned to liquid or gaseous form.

In an alternative form of embodiment, the fuel segregation device 22 is arranged in the upper part of the combustion chamber and therefore takes the form of a disk. Combinations of these two embodiments, or other embodiments, are also conceivable, so long as part of the surface of the combustion chamber 21 consists of such a fuel segregation device 22.

The combustion chamber 21 is extended at the bottom (along the longitudinal axis X) by a post-combustion chamber 24, of a type known per se, then by a throat 25 and a nozzle 26, likewise known per se.

The laws governing the sizing of the combustion chamber 21 outside of the region of the fuel segregation device 22, and the materials of which it is formed, are known to those skilled in the art and fall outside the scope of the present invention. This combustion chamber 21 is therefore not described in any further detail here.

The fuel segregation device 22 comprises, in the present non-limiting embodiment, a plurality of small-sized holes which allow the passage of liquid or gas, and notably the passage of fuel and therefore allow the combustion chamber to be supplied with fuel when the fuel liquefies or vaporizes under the effect of a high temperature. Such a temperature is observed at the surface of the fuel segregation device 22 when the oxidant is initially injected at high temperature into the combustion chamber 21 or when stable combustion has become established.

The holes of the fuel segregation device 22 are small enough that they block the flow of fuel when in solid form, namely when in the form of granules. In the present non-limiting example, the granules have a diameter of two to three millimeters, with a maximum pore diameter of around one millimeter. These dimensions are potentially dependent on the material of which the solid fuel is made.

The number of holes in the fuel segregation device 22 is high enough to ensure a liquid fuel flow rate that is compatible with the objectives regarding the volume of fuel consumed per second, and therefore the objectives regarding the thrust of the rocket engine 20.

The segregation device 22 in its external part, namely within the fuel reservoir 27, comprises a series of dividers 51 (see FIG. 5), here evenly angularly distributed about the surface of the segregation device 22.

These dividers 51 are planar elements arranged vertically (namely along the longitudinal axis X) and substantially along the local normal to the surface of the segregation device. These dividers 51 have the function of dividing the zone of the reservoir 27 close to the surface of the segregation device 22 into angular sectors subtending a few tens of degrees of arc at most. Having these dividers 51 arranged in geometric sectors encourages capillary supply of the segregation device with fuel in the pasty phase. Their radial length L (perpendicular to the longitudinal axis) is chosen to be greater than the thickness of that zone of the reservoir 27 in which the granules enter the pasty phase as they are heated.

Mode of Operation

Just as in the state of the art, the oxidant is initially injected at high temperature (using pyrotechnic ignition and/or catalytic decomposition) in order to vaporize the grains of fuel in contact with the fuel segregation device. Under the effect of the heat, these grains successively transform to the pasty, liquid and vapor phases. Once combustion has been initiated it is sustained by the injection of oxidant at ambient temperature and by the supply of the fuel segregation device with grains of fuel.

The fuel formed into granules therefore allows the fuel segregation device 22 to be supplied continuously. As may be seen in FIGS. 3a and 3b, the elastomer membrane 30 of the fuel reservoir 27 progressively deforms as fuel is consumed by combustion. Ultimately it conforms to the surface of the bottom part of the reservoir 27, or at least approximates to that shape, so as to drive the granules toward the segregation device for as long as possible and prevent the emergence of a volume of granules not used in the combustion.

As soon as the injection of oxidant stops, combustion ceases, the pasty phase of the fuel solidifies in the fuel segregation device 22. Some of the granules of solid fuel have fused into blocks separated by the dividers 51 near the segregation device 22 after the rocket engine becomes extinguished.

It is possible to reignite the motor by once again injecting a hot oxidant and thus reinitiate the cycle described hereinabove. Specifically, the radial dividers 50 determine blocks of granules each shaped as an arc of a circle (preferably subtending a few tens of degrees at most). These dividers 50 allow local heating of the lateral edges of the blocks of granules formed upon the cooling of said granules, and allow them to slide, under the effect of the pressurizing, toward the segregation device 22, thus allowing the rocket engine to be restarted after it has stopped.

Advantages

The use of fuel in the form of grains (beads) advantageously allows this fuel to be arranged in very compact geometries, such as a cylinder of large diameter and small height or alternatively in a spherical reservoir. It being possible for the grains to be supplied by a membrane-type or piston-type pressurizing system.

The use of the fuel segregation device advantageously allows the volume of the combustion chamber to be kept constant during combustion. It also makes it possible to encourage homogeneous combustion with the proliferation of vaporization sites (the holes in the fuel segregation device) and the development of a boundary layer.

The invention claimed is:

1. An anaerobic propulsion device of a hybrid type, the device comprising a segregation device arranged between a reservoir of granules of fuel in a solid form and a combustion chamber; the segregation device is configured to prevent the granules of the fuel in the solid form from passing between the reservoir and the combustion chamber, the segregation device comprises orifices to allow a passage of the fuel that has become pasty, liquid or vaporized; the reservoir comprises a pressure device to apply pressure to the granules to push the granules toward the segregation device, the pressure device comprises a deformable membrane arranged at a surface of the reservoir of the granules, and wherein the segregation device further comprises a structure made of porous material with open pores, wettable by the fuel that is locally liquefied under an action of heat.

2. The anaerobic propulsion device as claimed in claim 1, wherein the segregation device comprises a structure comprising holes, each of the holes having a dimension smaller than a predetermined dimension selected as a function of a mean diameter of the granules.

3. The anaerobic propulsion device as claimed in claim 1, wherein the combustion chamber is substantially cylindrical in shape, the segregation device constitutes at least a part of a lateral surface of the combustion chamber.

4. The anaerobic propulsion device as claimed in claim 1, wherein the segregation device constitutes at least a part of an upper surface of the combustion chamber.

5. The anaerobic propulsion device as claimed in claim 4, wherein the segregation device constitutes the part of the upper surface of the combustion chamber opposite an ejection orifice for combustion gases.

6. The anaerobic propulsion device as claimed in claim 1, wherein the propulsion device is a shape substantially exhibiting a symmetry of revolution about a vertical axis; and wherein the reservoir is arranged around the combustion chamber, at an opposite end thereof to an exhaust nozzle.

7. The anaerobic propulsion device as claimed in claim 1, wherein the reservoir comprises an elastomer membrane configured to separate, within the reservoir, a space to store the granules and a pressurizing space, the pressurizing space comprises pressurizing orifices connected to at least one gas injection system.

8. The anaerobic propulsion device as claimed in claim 1, wherein the reservoir comprises a set of radial dividers which are perpendicular to a surface of the segregation device, each of the radial dividers having a geometry with a capillary gradient to encourage the supply of the fuel in a paste or liquid form to the segregation device.

9. An anaerobic rocket engine, comprising the anaerobic propulsion device of the hybrid type as claimed in claim 1, a volume of the fuel, and a volume of liquid oxidant, wherein the fuel is a form of solids divided into granules.

10. The rocket engine as claimed in claim 9, wherein the fuel comprises beads made of at least one of a following: polyethylene, polybutadiene or paraffin.

11. The rocket engine as claimed in claim 10, wherein the beads have a diameter of one to five millimeters.

12. A satellite comprising the rocket engine as claimed in claim 9.

13. An anaerobic propulsion device of a hybrid type, the device comprising a segregation device arranged between a reservoir of granules of fuel in a solid form and a combustion chamber; the segregation device is configured to prevent the granules of the fuel in the solid form from passing between the reservoir and the combustion chamber, the segregation device comprises orifices to allow a passage of the fuel that has become pasty, liquid or vaporized; the reservoir comprises a pressure device to apply pressure to the granules to push the granules toward the segregation device, the pressure device comprises a deformable membrane arranged at a surface of the reservoir of the granules, and wherein the reservoir further comprises a set of radial dividers which are perpendicular to a surface of the segregation device, each of the radial dividers having a geometry with a capillary gradient to encourage the supply of the fuel in a paste or liquid form to the segregation device.

14. The anaerobic propulsion device as claimed in claim 13, wherein the segregation device comprises a structure comprising holes, each of the holes having a dimension smaller than a predetermined dimension selected as a function of a mean diameter of the granules.

15. The anaerobic propulsion device as claimed in claim 13, wherein the segregation device comprises a structure made of porous material with open pores, wettable by the fuel that is locally liquefied under an action of heat.

16. The anaerobic propulsion device as claimed in claim 13, wherein the combustion chamber is substantially cylindrical in shape, the segregation device constitutes at least a part of a lateral surface of the combustion chamber.

17. The anaerobic propulsion device as claimed in claim 13, wherein the segregation device constitutes at least a part of an upper surface of the combustion chamber.

18. The anaerobic propulsion device as claimed in claim 17, wherein the segregation device constitutes the part of the upper surface of the combustion chamber opposite an ejection orifice for combustion gases.

19. The anaerobic propulsion device as claimed in claim 13, wherein the propulsion device is a shape substantially exhibiting a symmetry of revolution about a vertical axis; and wherein the reservoir is arranged around the combustion chamber, at an opposite end thereof to an exhaust nozzle.

20. The anaerobic propulsion device as claimed in claim 13, wherein the reservoir comprises an elastomer membrane configured to separate, within the reservoir, a space to store the granules and a pressurizing space, the pressurizing space comprises pressurizing orifices connected to at least one gas injection system.

21. An anaerobic rocket engine, comprising the anaerobic propulsion device of the hybrid type as claimed in claim 13, a volume of the fuel, and a volume of liquid oxidant, wherein the fuel is a form of solids divided into granules.

22. The rocket engine as claimed in claim 21, wherein the fuel comprises beads made of at least one of a following: polyethylene, polybutadiene or paraffin.

23. The rocket engine as claimed in claim 22, wherein the beads have a diameter of one to five millimeters.

24. A satellite comprising the rocket engine as claimed in claim 21.

\* \* \* \* \*